United States Patent [19]

Youngner

[11] Patent Number: 4,762,593
[45] Date of Patent: Aug. 9, 1988

[54] DISTILLING APPARATUS

[76] Inventor: Philip G. Youngner, 919 - 18th St. S.E., St. Cloud, Minn. 56301

[21] Appl. No.: 63,307

[22] Filed: Jun. 17, 1987

Related U.S. Application Data

[63] Continuation of Ser. No. 874,089, Jun. 13, 1986, abandoned.

[51] Int. Cl.$^4$ ............................................. B01D 3/10
[52] U.S. Cl. .................................... 202/186; 202/205; 202/257; 202/264; 202/269; 203/1; 203/20; 203/91; 203/87; 159/DIG. 16; 159/DIG. 31; 159/DIG. 40; 55/36; 55/178
[58] Field of Search ............... 202/181, 182, 186, 257, 202/269, 205, 202, 264, 254; 203/1, 20, 91, 87, DIG. 18; 55/36, 178; 159/DIG. 4, DIG. 16, DIG. 31, DIG. 40

[56] References Cited

U.S. PATENT DOCUMENTS

| | | | |
|---|---|---|---|
| 1,087,907 | 2/1914 | Publicker | 202/186 |
| 1,116,965 | 11/1914 | Wilson | 202/186 |
| 1,831,887 | 11/1931 | Sieck, Jr. | 202/205 |
| 3,318,784 | 5/1967 | Murphy | 202/205 |
| 3,494,836 | 2/1970 | Standiford, Jr. | 203/11 |
| 3,528,890 | 9/1970 | Brown | 203/11 |
| 3,736,235 | 5/1973 | Sundquist | 203/11 |
| 3,741,878 | 6/1973 | Osdor | 202/185.2 |
| 3,779,871 | 12/1973 | Brown | 203/11 |
| 3,948,734 | 4/1976 | Kohl et al. | 202/185.2 |
| 4,269,664 | 5/1981 | Younger | 202/185.2 |
| 4,310,387 | 1/1982 | Sadhukhan | 202/185.2 |
| 4,327,184 | 4/1982 | Johnson et al. | 202/186 |
| 4,366,030 | 12/1982 | Anderson | 203/11 |
| 4,444,623 | 4/1984 | Youngner | 202/205 |
| 4,595,460 | 6/1986 | Hurt | 202/185.2 |

Primary Examiner—David L. Lacey
Assistant Examiner—V. Manoharan
Attorney, Agent, or Firm—Lawrence M. Nawrocki

[57] ABSTRACT

Distilling equipment comprising evaporation apparatus (2) including a boiling chamber (6) and equipment and conduits (46-59, 62, 63, 65-71) for supplying raw liquid to the boiling chamber at a predetermined level (43), a plurality of serial condensation stages (10, 20, 30), the first stage (10) connected to the top (7) of the boiling chamber (6) to receive gas therefrom and condense the gas by contact with cold recycled distillate from the final condensation stage (30), each stage having vertical vacuum producing bubble tubes (15, 25, 35) through which distillate and gas bubble (17) pass downward to a collection vessel (16, 26), gas carrier tubes (19, 29) which carry gas from each collection vessel (16, 26) to the condensation chamber (21, 31) of the following stage, and pump (41, 42) in cooperating conduits (18, 22, 28, 32) for pumping distillate free of gas from each collection chamber (16, 26) to the condensation chamber (21, 31) of the following stage.

9 Claims, 2 Drawing Sheets

DISTILLING APPARATUS

This is a continuation of Application Ser. No. 874,089, filed on June 13, 1986, now abandoned.

TECHNICAL FIELD

This invention relates to the field of chemical engineering, and particularly to intermediate-scale distilling applications such as for deriving potable water from a source which, because of non-volatile pollutants, is saline or otherwise not potable, for purifying and reclaiming industrial solvents, or for deriving alcohol of tractor-fuel grade as a byproduct of agricultural operations.

BACKGROUND OF THE INVENTION

Vacuum distillation is a well-known process for separating chemical components on the basis of differences in vapor pressure.

Distilling under vacuum has several advantages over distilling at atmospheric or superatmospheric pressures, because of the lower temperatures at which the process can be conducted. Economical low-grade heat sources may be used. Safety is enhanced by the low temperature operation, and thermal degradation of the chemical components is minimized. Furthermore, leaching of impurities from the walls of the apparatus itself is minimized. Some of the best materials of construction, such as polyethylene, cannot be used at the higher temperatures but work well at the temperatures of vacuum distillation.

In order to protect product purity, the vacuum should be generated by liquid head rather than by vacuum pumps. However, the ceiling height required by towers for achieving middle-or high-vacuum is often not available.

A vacuum distillation apparatus which works well in areas of limited headroom was patented by Applicant in U.S. Pat. No. 4,444,623 and is incorporated by reference. A shortcoming of that apparatus is that the presence of air bubbles requires the distillate pump to be a positive displacement pump such as a gear pump, which will pump a mixture of liquid and gas or vapor. Less expensive centrifugal pumps cannot be used because the gas or vapor accumulates at the center of the impeller and blocks the flow of liquid.

SUMMARY OF THE INVENTION

The present invention is an improvement to prior art vacuum distilling apparatus. A system embodying the invention comprises evaporation apparatus and condensation apparatus. The evaporation apparatus evaporates a portion of raw liquid, and the resulting vapor is cooled and condensed in the condensation apparatus for recovery.

The evapoation apparatus comprises a generally vertical boiling chamber containing spent liquid with a controlled liquid level. Circulation means includes a pump connected to the bottom of the boiling chamber, and having a conduit passing through a heat exchanger and a flow control valve to discharge into a sidearm of the boiling chamber. A portion of the spent liquid is withdrawn from the circulation conduit, and raw liquid is drawn into the circulation conduit to be heated and injected together with circulated spent liquid into the sidearm.

A connecting conduit directs vapor and/or gases from the boiling chamber to condensation apparatus for cooling and condensation.

The condensation apparatus coomprises two or more stages of vacuum generation and cooling of vapor and/or gases and distillate. Vertical bubble tubes in each stage carry a mixture of liquid and vapors and/or gas downward in a vacuum producing column terminating in a collection chamber. A gas carrier tube carries vapor and/or gases to the following stage, and liquid distillate is pumped to a distributor in a condensation chamber at the top of the following stage.

Use of the gas carrier tubes enables the use of a low cost centrifugal pump in each condensation stage, to avoid the use of positive displacement pumps with their attendant control requirements.

Various advantages and features of novelty which characterize this invention are pointed out with particularity in the claims annexed hereto and forming a part hereof. However, for a better understanding of the invention, its advantages, and objects attained by its use, reference should be made to the drawings which form a further part hereof, and to the accompanying descriptive matter, which illustrates and describes certain preferred embodiments of the invention.

DETAILED DESCRIPTION OF THE INVENTION

Figure 1:
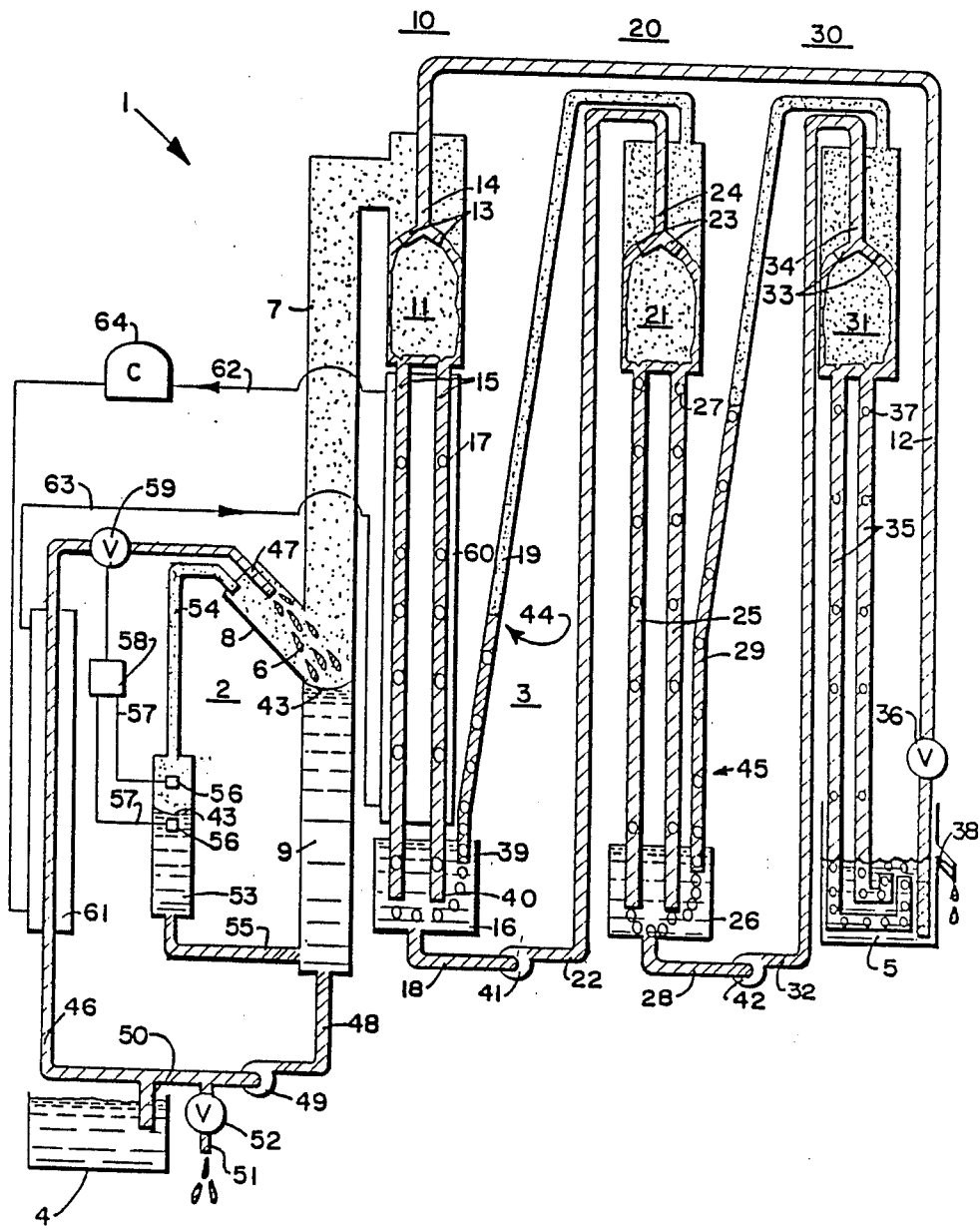
FIG. 1 is a schematic showing of a distillation system embodying the invention.

Referring now to the drawings wherein like reference numerals denote like elements throughout the several views, and particularly to FIG. 1, a distilling system 1 according to the invention is shown to generally comprise evaporation apparatus 2 and condensation apparatus 3. The system operates to tke raw liquid from raw liquid container 4 for distillation in a boiling chamber 6 under reduced pressure. The produced vapors are directed to condensation apparatus 3 for condensation and cooling at increasingly higher pressures, and a product distillate is delivered to distillate container 5.

Condensation apparatus 3 comprises two or more stages of condensation, each successive stage operating at a higher pressure. The embodiment of FIG. 1 shows a primary stage 10, an intermediate stage 20 and a final stage 30. If desired, intermediate stage 20 may be eliminated, leaving primary and final condensation stages 10 and 30. Alternatively, additional intermediate stages may be used in conjunction with the primary and final stages. Thus, intermediate stage 20 shown in FIG. 1 represents any number of intermediate stages, including none.

Primary condensation stage 10 includes condensation chamber 11 which receives vapors from boiling chamber 6 through connecting conduit 7. Also included are cooling means comprising recycle conduit 12 from final distillate container 5 of condensation stage 30. Conduit 12 terminates in distributor 14 within sealed primary condensation chamber 11. Cooled distillate from final distillate container 5 is passed through recycle conduit 12 at a flow rate controlled by recycle valve 36 and discharged through distributor 14 into primary condensation chamber 11. Distributor 14 directs the flow of cooled distillate against the inside walls of the lower portion of chamber 11, for example by the use of nozzles 13. Part or all of the entering vapor from the boiling chamber 6 is condensed by the flow of cooled distillate over the wall surfaces.

Condensation stage 10 also includes one or more generally vertical bubble tubes 15 extending downward from the lower portion of condensation chamber 11 into closed collection chamber 16, where the bubble tube or tubes 15 discharge. Each bubble tube 15 carries distillate, both recycled and freshly condensed, from primary condensation chamber 11 to the closed collection chamber 16. Non-condensibles, e.g., air, and uncondensed vapors are entrained by the liquid distillate entering the upper end of each bubble tube 15, and are carried downward with the distillate. Distillate gases and vapors are discharged together into collection chamber 16. Gases and vapors are carried downward primarily as discrete bubbles 17 which span the diameter of the bubble tubes 15. A portion of the gases and vapors may also be present as finely divided bubbles, i.e. foam.

The internal diameter of the bubble tubes is such that each discrete bubble 17 is in continuous contact with the entire internal circumference of bubble tube 15 as it is carried downward. The inside diameter of tube 15 is preferably less than the equilibrium bubble diameter of the vapor and/or gas bubbles within tube 15. For many liquids, a bubble tube diameter of about ¼ inch (0.63 cm) suffices. The bubble tube inside diameter should, in virtually every case, be less than 0.5 inch (1.27 cm). Slippage of distillate past the bubbles is minimal, and the downward velocity of bubbles and distillate is approximately the same.

Bubble tube or tubes 15 pass into closed collection chamber 16, which is sealed vacuum tight against intrusion of atmospheric air. Pump inlet conduit 18 extends from the bottom of collection chamber 16 to pump 41. Pump outlet conduit 22 connects the outlet of pump 41 with distributor 24 in intermediate condensation chamber 21. The primary distillate conduit means comprises pump 41, conduits 18 and 22, and distributor 24, with related nozzles 23, for transporting distillate from collection chamber 16 to condensation chamber 21. The pump 41 is preferably a centrifugal pump. Note that if the condensation apparatus comprises only the primary and final stages, conduit 22 will be connected to distributor 34 of the final condensation stage 30.

Gas carrier tube 19 has its lowermost terminus in the upper portion of collection chamber 16 and extends to the upper portion of condensation chamber 21, or to condensation chamber 31 if intermediate stage 20 is not used. The inlet 39 of carrier tube 19 is above the outlets 40 of bubble tubes 15 in chamber 16, so that the outlets 40 remain submerged. Gas and vapor bubbles discharged from bubble tubes 15 rise within collection chamber 16, pass into gas carrier tube 19 and are carried thereby and discharged into the condensation chamber 21 or 31.

Gas carrier tube 19 has an inside diameter larger than the equilibrium diameter of gas and vapo bubbles which enter it. Thus, gas and vapor are transported upward without carrying slugs of distillate. Condensation chamber 21 is at a pressure slightly lower than collection chamber 16, and the level 44 of distillate which rises in the gas carrier tube 19 is generally slight, and does not appreciably reduce the total head of first stage 10. A gas carrier tube with an inside diameter of about 0.75 inch (1.9 cm) or larger generally works well.

The equilibrium bubble diameter is defined herein as the diameter at which the surface tension at the bubble surface is just sufficient to maintain bubble integrity under the particular flow conditions. A bubble having a diameter greater than the equilibrium value tends to divide into smaller bubbles and will offer little resistance to liquid flow between the bubble and the tube surface. On the other hand, a bubble of large equilibrium diameter in a tube of smaller inside diameter exerts outward force against the tube wall to hinder liquid flow past the bubble.

The purpose of gas carrier tube 19 is to prevent appreciable quantities of gas and/or vapor from entering pump 41. A centrifugal pump, simpler and less expensive than a positive displacement pump, may then be used. The use of gas carrier tubes 19 and 29 and centrifugal pumps 41 and 42 in the condensation apparatus 3 unexpectedly results in a system which may be operated in a continuously stable condition without the flow and pressure controls required by prior art distillation apparatus.

Intermediate condensation stage or stages 20 are similar to primary stage 10. Intermediate stage 20 includes condensation chamber 21 and collection chamber 26, sealingly connected by one or more bubble tubes 25. Within chamber 21 are a distributor 24 shown as having nozzles 23, and the terminus of the gas carrier tube of the previous stage, shown as tube 19. Intermediate distillate conduit means, comprising pump inlet conduit 28, pump 42, pump outlet conduit 32, with related nozzles 33, and distributor 34, sealingly connect intermediate collection chamber 26 with the condensation chamber of the following stage, whether intermediate or final. Intermediate gas carrier tube 29 sealingly connects the upper portion of chamber 26 with the following condensation chamber, for transporting vapors and/or gases thereto.

Thus, the primary condensation stage 10 and secondary condensation stage or stages 20, if any, each act to produce a reduced pressure, cool and condense entering vapors, and transport a stream of distillate and a separate stream of vapors and/or gases to the next stage, and ultimately to the final stage 30.

Final condensation stage 30 includes condensation chamber 31 and final distillate container 5. One or more bubble tubes 35 are sealingly connected to the lower portion of condensation chamber 31 and have their lower end submerged in distillate within container 5. The distillate container 5 may be open to the atmosphere or may be closed except for specific liquid and vapor/gas outlets. In the former case, overflow 38 maintains the required liquid level and delivers the final product distillate. Alternatively, the liquid level may be maintained with a pump, as for example where the distillate is to be withdrawn to a further process in a chemical plant.

Recycle conduit 12 extends from the lower portion of distillate container 5, where its end is submerged in distillate, to distributor 14 in primary condensation chamber 11. The pressure difference between container 5, e.g. at atmosphereic pressure and chamber 11, partial vacuum forces a portion of the final distillate through conduit 12. The liquid head in conduit 12 is less than the cumulative head in the bubble tubes of the condensation stages. The rate of distillate flow in conduit 12 is controlled by valve 36 which may be manually adjusted or motor-operated.

The level of reduced presure or vacuum in boiling chamber 6 is determined by the cumulative liquid head created by the bubble tubes of all the condensation stages. Thus, in FIG. 1, the level of reduced pressure is determined by the cumulative liquid head of bubble tubes 15, 25 and 35. This cumulative head reduces the pressure in boiling chamber 6 relative to the final pressure in distillate container 5. The latter container may be at atmospheric pressure, or some other pressure.

The height of bubble tubes 15 may vary from a foot or less to a height providing full vacuum, approximately 34 feet (10.3 meters) for pure water. More typically, a bubble tube height of 5-7 feet (1.5-2.0 meters( in each stage is used, and higher vacuum is achieved through the use of multiple condensation stages.

The number of bubble tubes 15, 25 or 35 in each condensation stage must be such that the downward velocity in the tubes is relatively low. Turbulence associated with high flow rates increases the frictional pressure drop and thus reduces the effective pressure difference, i.e. vacuum, across the stage.

Although the condensation stages may each be situated at different elevations, one purpose of this invention is distillation where the headroom is limited, for example in a conventional building with 7-8 foot (2-2.4 meter) ceilings. Preferably, the condensation stages 10, 20 and 30 are located at approximately the same elevation.

Several other factors also affect the cumulative head. For example, the head is reduced by the height occupied by gas and vapor bubbles in the bubble tubes. The density of the distillate will also affect the level of vacuum which may be achieved.

Turning now to evaporation apparatus 2, boiling chamber 6 is shown in FIG. 1 as preferably comprising a generally vertical tubular member. The upper portion is a connecting conduit 7 sealingly connected to the primary condensation chamber 11, and a lower portion 9 is generally liquid filled to a controlled level 43. Upwardly extending sidearm 8 of boiling chamber 6 is situated above liquid level 43, and has sealingly mounted therein the terminus 47 of feed conduit 46, through which raw liquid enters the boiling chamber 6.

Liquid level leg 53 has an upper conduit 54 open to boiling chamber 6 at an elevation above liquid level 43, and has a lower conduit 55 open to the bottom of chamber 6, so that the liquid level in leg 53 is the same as taht in boiling chamber 6.

Conduit 48 extends from the bottom of boiling chamber 6 to the inlet of circulation pump 49, and feed conduit 46 extends from the outlet of pump 49 to sidearm 8, for circulating spent raw liquid from the boiling chamber bottom to be discharged into sidearm 8. Control valve 59 in feed conduit 46 controls the flow rate of liquid to maintain liquid level 43 within prescribed limits. Valve 59 may be manually or automatically controlled. Any means for regulating valve 59 based on liquid level measurement may be used. In the embodiment of FIG. 1, level detection means 56 such as spaced float switches in leg 53 send control signals to controller 58 when liquid level 43 rises or drops to the level of a float switch. Controller 58 opens valve 59 when liquid level 43 is indicated to be too low, and closes valve 59 when liquid level 43 is indicated to be too high. Control valve 59 may be a solenoid valve or may be a variable position valve positioned by an electric or pneumatic motor, for example.

Connecting conduits to feed conduit 46 include an inlet 50 for introducing raw liquid into the distilling system 1 from raw liquid container 4, and an outlet 51 with valve 52 for discharging a portion of the spent liquid from the system. Raw liquid is drawn into feed conduit 46 through inlet 50 by the pressure difference when control valve 59 is open. Circulation pump 49 generates a pressure greater than the pressure into which liquid outlet 51 discharges, for example atmospheric pressure.

In the embodiment shown in FIG. 1, liquid outlet 51 is located near to pump 49 to receive the maximum pumping pressure for discharing spent liquid. A subatmospheric pressure at outlet 51 is undesirable because air will then be drawn into conduit 46 when valve 52 is opened. Feed inlet 50 is located more distant from pump 49 and closer to control valve 59, so that a slight vacuum will be produced at inlet 50 even though a slight superatmospheric pressure is present at valve 52.

Condensation apparatus 3 may also include heat exchange apparatus for cooling distillate, vapors and gas. One embodiment, shown in FIG. 1, is depicted as heat exchanger 60 through which bubble tubes 15 of first stage 10 pass. A cold fluid is pumped through exchanger 60, cooling the bubble tubes to condense the vapors carried therein. Additional similar heat exchangers may be incorporated into further condensation stages, but are not shown for the sake of simplicity.

Evaporation apparatus 2 includes heat exchanger 61 through which feed conduit 46 is passed, for heating raw liquid carried in conduit 46. A heating fluid passed through heat exchanger 61 to heat conduit 46 and liquid carried therein may be heated by any heat source, including solar energy, combustion of low or high grade fuels, or recovered waste heat.

Preferably, heat exchanger 60 is connected to heat exchanger 61 by fluid conduits 62 and 63 so that heat transfer fluid circulating therethrough is heated in heat exchanger 60 and cooled in heat exchanger 61. For example, a phase change heat transfer fluid such as freon may be circulated through the heat exchangers by heat pump or compressor 64 in fluid conduit 62. A supplemental heat source may also be used to further heat the mixture of raw liquid and spent liquid circulating in conduit 46.

Figure 2:
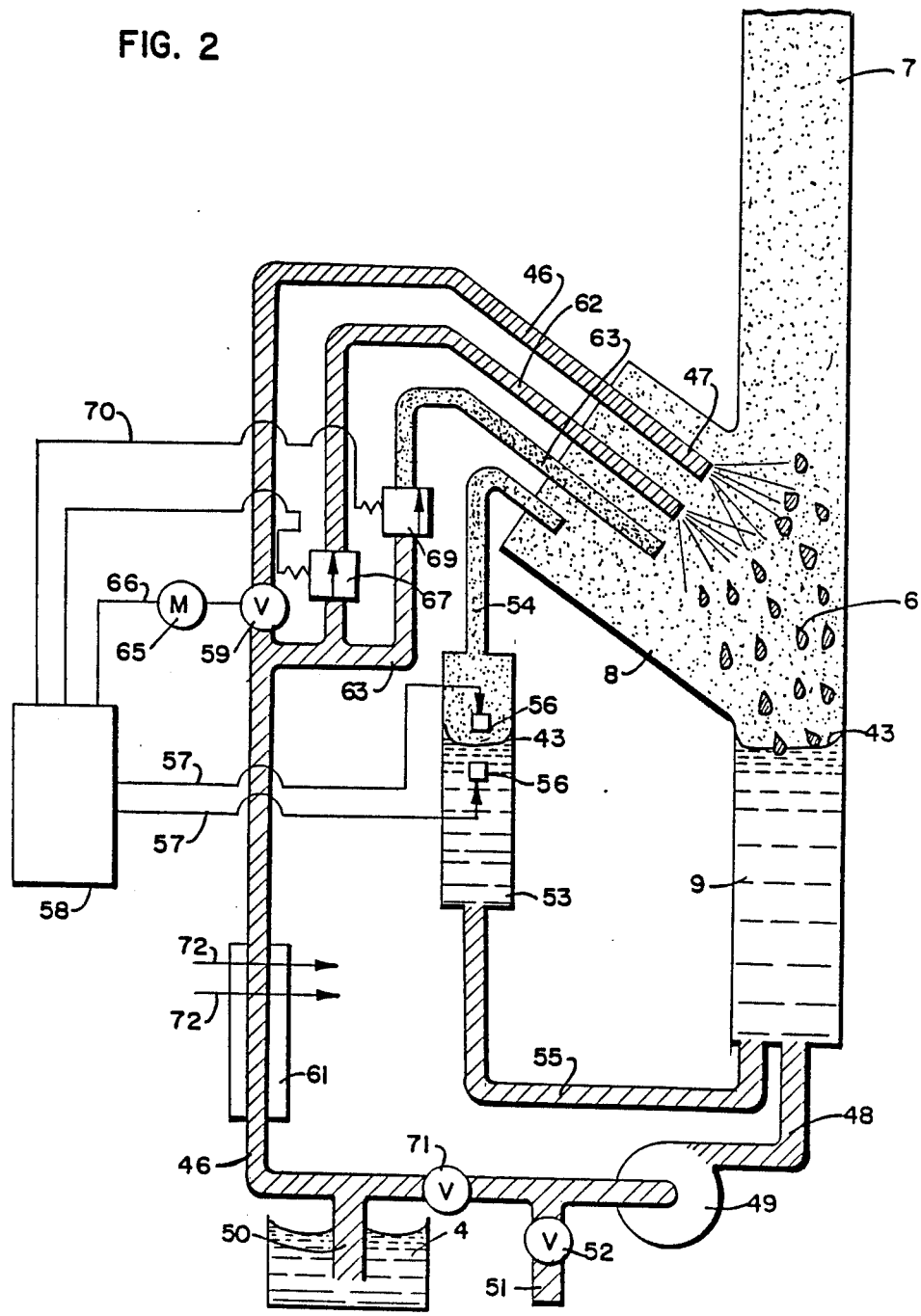
FIG. 2 is a schematic depiction of the evaporation apparatus of the invention.

Turning now to FIG. 2, a further embodiment of evaporation apparatus 2 is depicted.

Boiling chamber 6 is shown as having an upper connecting conduit 7 which is connected at its upper end to a primary condensation chamber, previously shown in FIG. 1. A lower portion 9 of the boiling chamber 6 is connected by open lower conduit 55 to liquid level leg 53 with liquid level detection means 56 such as float switches mounted therein. An open upper conduit 54 joins leg 53 to the vapor space in boiling chamber 6 above the liquid level 43 therein. The liquid level in leg 53 is the same as that in chamber 6, and both are represented as level 43.

As shown in FIG. 2, boiling chamber 6 includes an upwardly extending sidearm 8 enclosing an evaporation space. Feed conduits 46, 62 and 63 terminate in sidearm 8 and discharge raw liquid into the sidearm for evaporation at reduced pressure, i.e. vacuum.

As in the embodiment of FIG. 1, evaporation apparatus 2 shown in FIG. 2 also includes means for circulating spent liquid, comprising conduit 48, circulation pump 49, feed conduit 46 passing through heat exchanger 61, and valve 59 in feed conduit 46. Liquid level detection means 56 such as float switches are connected by control conduits 57 to controller 58. Valve motor 65 positions valve 59 in response to signals transmitted by controller 58 through signal conductor 66. Motor 65 is preferably a reversible electric motor, geared down to 1 RPM or less.

This embodiment also includes second and third feed conduits 62 and 63, respectively, which intersect conduit 46 downstream of heat exchanger 61 but upstream of control valve 59, and are connected to sidearm 8 for discharging liquid therein. A normally open solenoid valve 67 in second feed-conduit 62 is connected to controller 58 by signal conductor 68. A normally closed solenoid valve 69 in third feed conduit 63 is connected to controller 58 by signal conductor 70. Controller 58 actuates valves 59, 67 and 69 through signal conductors 66, 68 and 70 based on the liquid level 43 in leg 53.

It is understood that heat exchanger 61 is externally provided with heating fluid, as suggested by arrows 72.

Feed inlet 50 connects with conduit 46 and extends below the liquid level of raw liquid in raw liquid container 4. Outlet 51 having valve 52 is located near pump 49 for discharging spent liquid generated in boiling chamber 6.

Optional valve or restriction 71 in conduit 46, between inlet 50 and outlet 51, restricts the flow from pump 49 to increase its pressure at outlet valve 52.

It is understood that boiling chamber 6 and each of the condensation chambers can include filler holes, not shown, for filling the apparatus with liquid for the first startup. These filler holes are sealed during operation.

The connections between conduits and other elements in the entire apparatus are sealed so that during operation, the only openings to the atmosphere are the upper surface of raw water in container 4, overflow 38, and spent liquid outlet 51.

OPERATION

Turning again to FIG. 1, the operation of the distilling system is as follows: The liquid head in bubble tubes 15, 25 and 35 produce a negative pressure or vacuum in condensation chambers 11, 21 and 31. The highest vacuum occurs in chamber 11 and results from the additive heads in all three stages 10, 20 and 30.

Pumps 41 and 42 are preferably centrifugal pumps whose pumping rate goes to zero at a particular pressure head. If the flow rate of distillate into chamber 16, for instance, increases, distillate will move up tube 19 to raise liquid level 44. This reduces the presure difference across pump 41, so that its output increases. Thus, within limits, the movement of distillate, gases and vapors through the condensation apparatus is self-controlling, and flow regulators, pump speed controls, and the like are not required to maintain the desired vacuum level in boiling chamber 6.

Initial startup requires that liquid (preferably the intended distillate) be added to each of the condensation chambers to create a liquid level in the collection chambers and a liquid head in the bubble tubes. In addition, raw liquid is placed in boiling chamber 6 to the desired liquid level 43.

Pumps 49, 41 and 42 are then activated to start the system. Vapor and gases entering each collection chamber 16, 26 rise and pass into gas carrier tubes 19, 29. Thus, the distillate pumped by pumps 41 and 42 is essentially gas-free. Centrifugal pumps, which become gasbound if gas is present in the liquid, can thus be used as pumps 41 and 42 because of the gas carrier tubes.

In each condensation chamber 11, 21, 31, cold distillate is distributed to the wall surfaces to condensate vapors originating in boiling chamber 6. Gases and uncondensed vapors are entrapped and pass downward through bubble tubes 15, 25 and 35 as interspersed bubbled. Air initially in the system is quickly removed and a high vacuum produced.

The high vacuum in boiling chamber 6 draws raw liquid from raw liquid container or reservoir 4 into inlet 50. The rate of flow through valve 59 in conduit 46 is adjusted either manually or automatically so that the liquid flow rate including circulating flow of spent liquid equals the flow rate of pump 49 plus an amount to compensate for the evaporation loss to condensation apparatus 3.

In order to achieve both discharge of spent liquid from outlet 51 at superatmospheric pressure and the entrance of raw liquid into inlet 50 at subatmospheric pressure, a pressure drop must exist between valve 52 and inlet 50. The length of conduit 46 between valve 52 and inlet 50 may be sufficiently long to provide the pressure drop.

In the alternative embodiment, shown in FIG. 2, valve or restriction 71 is used to increase the pressure drop from valve 52 to inlet 50 so that a superatmospheric pressure will discharge spent liquid from outlet 51, and a subatmospheric pressure will draw raw liquid into submerged inlet 50 and conduit 46. Valve 71 also acts to limit liquid flow through conduit 46, preventing dilution of raw liquid in container or reservoir 4 by spent liquid.

The warm raw liquid passing through conduit 46 emerges into the sidearm 8 where it bursts into a spray of fine droplets because of the high vacuum. The large surface area of the fine droplets promotes rapid evaporation, and unevaporated liquid, herein called spent liquid, falls to the bottom 9 of the chamber 6.

The fraction of warm raw liquid entering sidearm 8 which evaporates is a function of the liquid temperature and the enthalpy required for vaporization. Control valve 59 acts to maintain the predetermined liquid level 43 by admitting raw liquid through inlet 50 and conduit 46. The flow rate of spent liquid through outlet 51 depends upon whether a small component is to be distilled from a large stream or whether the major portion of the stream is to be distilled and recovered.

As an example, assume evaporation of water from an impure raw water stream. A stream of raw water at 90 degrees F (32 degrees C) evaporating in sidearm 8 to produce a liquid temperature of 72 degrees F. (22 degrees C) results in vapor comprising about 2 percent of the original water stream. The remaining 98 percent falls to the lower portion 9 of the boiling chamber as "spent" liquid. If the portion of liquid wasted from outlet 51 equals the portion evaporated, valve 59 will automaticaly adjust to permit an inflow of raw liquid equal to 4(2+2) percent of the original raw water stream. Thus, wasted spent water will have an impurity concentration twice that of the raw water.

If the head of liquid below liquid level 43 in boiling chamber 6 is sufficiently great, pump 49 will automatically regulate the liquid level 43 because changes in level will affect the inlet head on pump 49, and the flow rate it produces. Thus, valve 59 can be manually set to control the liquid level.

The head of liquid above pump 49 may be insufficinet to achieve the required self regulation of liquid level, in which case valve 59 must be controlled through a controller 58 based on measured liquid level.

Turning now to FIG. 2, which shows an embodiment providing finer control over the flow rate of raw liquid and spent liquid to sidearm 8. Feed conduit 46 is as previously described. Second feed conduit 62 and third feed conduit 63 also carry raw and spent liquid to be evaporated in boiling chamber 6. A rising liquid level 43 causes the uppermost of the float valves 56 to make a relay contact in controller 58. Solenoid valve 67 is closed by controller 58 and valve 59 is turned to a more closed position by motor 65. This reduces the raw water flow to boiling chamber 6 and lowers liquid level 43.

Similarly, a dropping liquid level 43 which activates the lowermost of float valves 56 causes motor 65 to further open valve 59, and opens solenoid valve 69 to increase liquid flow to boiling chamber 6.

Solenoid valve 67 and 69 makes instantaneous but brief corrections to deviations from the normal liquid level 43. The motorized valve 59 makes slower but longer-lasting corrections. Working together, the solenoid valves help the motorized valve to center upon a correct position and to hold that position. Without the solenoid valves, the motorized valve will overshoot its correct position, causing it to go into a continuous hunting mode.

An advantage of the present invention as herein described is that the use of gas carrier tubes between condensation stages permits the use of centrifugal pumps 41, 42 for moving gas-free distillate from stage to stage. The pressure v. flow pumping curves for such pumps provide a self-regulating feature, eliminating the necessity for much of the control apparatus used in prior distillation apparatus.

The resulting simplification provides an easily operated, notably inexpensive vacuum still for high rate distillation of a variety of raw liquids. The distilling appartus may be operated unattended over long time periods.

Low grade heat sources may be used to provide thermal energy, and heat added in the evaporation apparatus 2 may be recovered in the condensation apparatus 3 for re-use. Thus, operation of the apparatus is thermally efficient.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A vacuum distilling apparatus comprising in combination:
   (a) evaporation apparatus including a boiling chamber, means for supplying raw liquid to said boiling chamber at a predetermined level, and connecting conduit means for directing vapors from said boiling chamber to a primary stage of a condensation apparatus;
   (b) said primary condensation stage including a closed primary condensation chamber above said predetermined level and connected to, and being in fliud communication with, said connecting conduit means to receive, cool and condense said vapors therefrom, a primary collection chamber below said primary condensation chamber, at least one primary bubble tube connected to the lower portion of said primary condensation chamber and extending downward into said primary collection chamber, for carrying gas bubbles and distillate downward from said primary condensation chamber to said primary collection chamber, primary distillate conduit means extending from the bottom of said primary collection chamber to a final distributor in a final condensation chamber of a final condensation stage, said primary distillate conduit means including a primary pump for delivering essentially gasfree distillate from said primary collection chamber to said final condensation chamber, and a primary gas carrier tube connecting the upper portion of said primary collection chamber, at a level above the lower ends of said at least one primary bubble tube, to said final condensation chamber;
   (c) a final condensation stage including said final condensation chamber having said final distributor therein, for receiving said distillate from said final distributor and gases from said primary gas carrier tube, at least one final bubble tube connected to the lower portion of said final condensation chamber and extending downward into a final distillate downward from said final condensation chamber to said final distillate container wherein a liquid level is maintained; and
   (d) a valved recycle conduit extending from the lower portion of said final distillate container to a primary distributor within said primary condensation chamber for supplying cooled distillate to said primary stage for condensing said vapors from said boiling chamber.

2. The vacuum distilling apparatus according to claim 1 wherein said gas carrier tube has an inside diameter of at least 0.75 inch (1.9 cm).

3. The vacuum distilling apparatus according to claim 1 wherein said primary pump is a centrifugal pump.

4. The vacuum distilling apparatus according to claim 1 wherein the inside diameter of said primary and final bubble tubes is less than 0.5 inch (1.27 cm).

5. The vacuum distilling apparatus according to claim 1 wherein:
   (a) said boiling chamber is generally vertical with a controlled liquid level in its lower portion, and having a sidearm above said liquid level for receiving raw liquid and a circulated spent liquid; and
   (b) said means for supplying raw liquid to said boiling chamber includes means for circulating and heating spent liquid from said lower portion of said boiling chamber by a circulation pump to pass through a flow control valve for discharge into said sidearm for evaporation, a valved spent liquid outlet downstream of said circulation pump for discharging spent liquid, and a raw liquid inlet downstream of said spent liquid outlet for drawing raw liquid into said sidearm by vacuum.

6. A vacuum distilling apparatus comprising in combination:
   (a) evaporation apparatus including a boiling chamber, means for supplying raw liquid to said boiling chamber at a predetermined level, and connecting conduit means for directing vapors from said boiling chamber to a primary stage of a condensation apparatus;

(b) said primary condensation stage including a closed primary condensation chamber above said predetermined level connected to, and being in fluid communication with, said connecting conduit means to receive, cool and condense said vapors therefrom, a primary collection chamber below said primary condensation chamber, at least one primary bubble tube connected to the lower portion of said primary condensation chamber and extending downward into said primary collection chamber, for carrying gas bubbles and distillate downward from said primary condensation chamber to said primary collection chamber, primary distillate conduit means extneding from the bottom of said primary collection chamber to an intermediate distributor in an intermediate condensation chamber of an intermediate condensation stage, said primary distillate conduit means including a primary pump for delivering essentiall gasfree distillate from said primary collection chamber to said intermediate condensation chamber in said intermediate condensation stage, and a primary gas carrier tube connecting the upper portion of said primary collection chamber, at a level above the lower ends of said at least one primary bubble tube, to said intermediate condensation chamber in said intermediate condensation stage;

(c) an intermediate condensation stage including a closed intermediate condensation chamber having said intermediate distributor therein, for receiving said distillate from said intermediate distributor and gases from said primary gas carrier tube, an intermediate collection chamber below said intermediate condensation chamber, at least one intermediate bubble tube connected to the lower portion of said intermediate condensation chamber and extending downward from said intermediate condensation chamber, for carrying gas bubbles and distillate downward from said intermediate condensation chamber to said intermediate collection chamber, intermediate distillate conduit means extending from the bottom of said intermediate collection chamber to a final distributor in a final condensation chamber of a final condensation stage, said intermediate distillate conduit means including an intermediate pump for delivering essentially gas-free distillate from said intermediate collection chamber, and an intermediate gas carrier tube connecting the upper portion of said intermediate collection chamber, at a level above the lower ends of said at least one intermediate bubble tube, to said final condensation chamber;

(d) a final condensation stage including said final condensation chamber having said final distributor therein, for receiving said distillate from said final distributor and gases from said intermediate gas carrier tube, at least one final bubble tube connected to the lower portion of said final condensation chamber and extending downward into a final distillate container, for carrying gas bubbles and distillate downward from said final condensation chamber to said final distillate container wherein a liquid level is maintained; and (e) a valved recycled conduit extending from the lower portion of said final distillate container to a primary distributor within said primary condensation chamber for supplying cooled distillate to said primary stage for condensing said vapors from said boiling chamber.

7. The vacuum distilling apparatus according to claim 6 wherein said primary and intermediate gas carrier tubes have an inside diameter of at least 0.75 inch (1.9 cm.).

8. The vacuum distilling apparatus according to claim 6 wherein said primary and intermediate pumps are centrifugal pumps.

9. The vacuum distilling apparatus according to claim 6 wherein the inside diameter of said primary, intermediate and final bubble tubes is less than 0.5 inch (1.27 cm.).

* * * * *